(12) United States Patent
Moriwaki

(10) Patent No.: US 9,140,433 B2
(45) Date of Patent: Sep. 22, 2015

(54) MULTI DISPLAY SYSTEM, AND DISPLAY DEVICE

(75) Inventor: Hiroyuki Moriwaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 54 days.

(21) Appl. No.: 14/117,605

(22) PCT Filed: May 9, 2012

(86) PCT No.: PCT/JP2012/003025
§ 371 (c)(1),
(2), (4) Date: Nov. 13, 2013

(87) PCT Pub. No.: WO2012/157207
PCT Pub. Date: Nov. 22, 2012

(65) Prior Publication Data
US 2014/0218918 A1  Aug. 7, 2014

(30) Foreign Application Priority Data
May 16, 2011  (JP) ................................ 2011-109189

(51) Int. Cl.
*F21V 1/00* (2006.01)
*F21V 11/00* (2015.01)
*F21V 17/10* (2006.01)
*H04N 5/64* (2006.01)
*G02F 1/1333* (2006.01)
*F21V 5/04* (2006.01)

(52) U.S. Cl.
CPC ................. *F21V 17/101* (2013.01); *F21V 5/04* (2013.01); *G02F 1/13336* (2013.01); *H04N 5/64* (2013.01); *G02F 2201/503* (2013.01); *G09G 2300/026* (2013.01)

(58) Field of Classification Search
CPC ........... F21V 17/101; F21V 5/04; H04N 5/64; G02F 1/13336; G02F 2201/503; G09G 2300/026
USPC ......................... 362/237, 311.01; 345/64, 173
See application file for complete search history.

(56) References Cited

U.S. PATENT DOCUMENTS

| | | | |
|---|---|---|---|
| 5,465,315 A * | 11/1995 | Sakai et al. | 385/116 |
| 5,867,236 A * | 2/1999 | Babuka et al. | 349/73 |
| 6,927,908 B2 * | 8/2005 | Stark | 359/449 |
| 2005/0078104 A1 * | 4/2005 | Matthies et al. | 345/204 |
| 2006/0001796 A1 * | 1/2006 | Chang et al. | 349/95 |
| 2006/0238440 A1 * | 10/2006 | Kim et al. | 345/1.1 |
| 2007/0058114 A1 * | 3/2007 | Niiyama et al. | 349/106 |
| 2008/0297695 A1 * | 12/2008 | Sekiguchi et al. | 349/65 |

(Continued)

FOREIGN PATENT DOCUMENTS

| JP | 2010-72522 A | 4/2010 |
|---|---|---|
| WO | 2008/149449 A1 | 12/2008 |
| WO | 2010/092794 A1 | 8/2010 |

*Primary Examiner* — Anh Mai
*Assistant Examiner* — Glenn Zimmerman
(74) *Attorney, Agent, or Firm* — Chen Yoshimura LLP

(57) ABSTRACT

The present invention aims at mitigating a light guide member being peeled off and a display panel being damaged by stress exerted on an adhesive section or the like between the light guide members. A multi-display system has a plurality of display devices (100) arranged in a matrix such that a cushioning member (310) is arranged alongside a light guide member (150) and between the respective light guide members (150) of two of the adjacent display devices (100) among the plurality of display devices (100).

9 Claims, 17 Drawing Sheets

(56) References Cited

U.S. PATENT DOCUMENTS

2011/0254790 A1* 10/2011 Suzuki et al. ............... 345/173
2011/0310488 A1* 12/2011 Tomotoshi et al. ........... 359/601
2012/0069273 A1*  3/2012 Watanabe ..................... 349/64

* cited by examiner

MULTI DISPLAY SYSTEM, AND DISPLAY DEVICE

TECHNICAL FIELD

The present invention relates to a display device, and a multi-display system that displays seamless images using this display device.

BACKGROUND ART

The development of large-screen displays for use with digital signage and the like has been robust recently. In particular, attention has been focused on multi-display systems in which a plurality of ultra narrow-frame displays are combined together to form a large screen.

When combining a plurality of displays to form this large screen, it is preferable for the seams of the displays to be difficult to see. Therefore, there have been attempts to make these seams harder to see by arranging a frame-shaped light guiding member such as a lens at the periphery of each display and performing seamless display so as to make the seams difficult to see. (Patent Document 1, for example).

RELATED ART DOCUMENT

Patent Document

Patent Document 1: Japanese Patent Application Laid-Open Publication No. 2010-72522

SUMMARY OF THE INVENTION

Problems to be Solved by the Invention

However, when providing a light guide member made of an acrylic resin or the like on the periphery of each display device in order to perform seamless display on a large screen of a multi-display system, if the display devices are arranged in a matrix with no spaces therebetween, then stress will be exerted on the adhesive sections or the like between the respective light guide members due to the light guide members being directly in contact with each other. This may cause the light guide members to peel off, and the display panel to be damaged.

The present invention aims at mitigating the light guide members being peeled off and the display panel being damaged by stress being exerted on the adhesive sections or the like between the respective light guide members, even when a plurality of display devices are arranged in a matrix to form a seamless large screen of multi-display system.

Means for Solving the Problems

A multi-display system of the present invention has a plurality of display devices, each display device including: a display panel; a casing that houses the display panel, a surface on a viewing side of the display panel including a window-frame part at a periphery of the display panel, a display image of the display panel being viewable externally via a window defined by the window-frame part, the casing including the window-frame part that covers part of the display panel on the viewing side; and a light guide member covering a peripheral area of the surface on the viewing side of the display panel and covering a surface of the window-frame part, the light guide member guiding light for image display to outside of the display panel, wherein the plurality of display devices are arranged in a matrix such that a cushioning member is arranged along the light guide member, the cushioning member being between the respective light guide members of two adjacent display devices of the plurality of display devices.

With the above configuration, the cushioning member is provided along the light guide member and between the respective light guide members of two adjacent display devices, and thus, even when the plurality of display devices are arranged in a matrix, the respective light guide members of the adjacent display devices are not in contact with each other. Therefore, the light guide members being peeled off and the display panel being damaged by stress being exerted on adhesive sections or the like between the light guide members is mitigated.

In the multi-display system of the present invention, it is preferable for each display device to have an outer edge of the light guide member positioned further inside a periphery of the casing than an outer side face of the casing, and for the cushioning member to be in contact with the outer edge of the light guide member and the surface of the window-frame part.

With the above configuration, an outer edge of the light member is positioned further inside a periphery of the casing than an outer side face of the casing, and thus, even if the cushioning member is provided along the light guide member and between the respective light guide members of two adjacent display devices, the distance between the display devices can be shortened more than if an outer edge of the light guide member were positioned further outside a periphery of the casing than an outer side face of the casing.

It is preferable for the cushioning member to be made of a transparent elastic material, and preferable for the transparent elastic material to be an acrylic sheet or a urethane gel sheet, for example.

Another configuration of the multi-display system of the present invention has a plurality of display devices, each display device including: a display panel; a casing that houses the display panel, a surface on a viewing side of the display panel including a window-frame part at a periphery of the display panel, a display image of the display panel being viewable externally via a window defined by the window-frame part, the casing including the window-frame part that covers part of the display panel on the viewing side; a light guide member covering a peripheral area of the surface on the viewing side of the display panel and covering a surface of the window-frame part, the light guide member guiding light for image display to outside of the display panel; and a cushioning member provided so as to extend along the light guide member and to cover an outer side face of the light guide member, wherein the plurality of display devices are arranged in a matrix such that the cushioning member is arranged between the respective light guide members of two adjacent display devices of the plurality of display devices.

With the above configuration, the cushioning member is provided along the light guide member and between the respective light guide members of two adjacent display devices, and thus, even when the plurality of display devices are arranged in a matrix, the respective light guide members of the adjacent display devices are not in contact with each other. Therefore, the light guide members being peeled off and the display panel being damaged by stress being exerted on adhesive sections or the like between the light guide members is mitigated. Furthermore, each display device has the cushioning member provided so as to extend along the light guide member and to cover an outer side face of the light guide member, and thus, combining these display devices together can result in a seamless multi-display system in which the light guide members being peeled off and the display panel being damaged is mitigated.

In the multi-display system of the present invention, it is preferable for each display device to have an outer edge of the light guide member positioned further inside a periphery of the casing than an outer side face of the casing, and for the cushioning member to be in contact with the outer edge of the light guide member and the surface of the window-frame part.

In the multi-display system of the present invention, the light guide member may be a plano-convex lens including a first flat surface that faces the display panel side, a convex surface that bulges towards the display viewing side, and a second flat surface that forms an outer side face of the light guide member, and the cushioning member may cover the second flat surface.

The cushioning member may cover the entire convex surface and second flat surface.

The cushioning member may also cover the second flat surface and a portion of the convex surface.

In the multi-display system of the present invention, it is preferable for the cushioning member to include a cushioning member part having adhesive characteristics, and a non-adhesive film covering a surface of the cushioning member part, the surface being opposite to the light guide member.

With the above configuration, even if the cushioning member part is made of a material having adhesive characteristics, the surface opposite to the light guide member is covered with the non-adhesive film, and thus, each display device can be dissembled again after the display devices are arranged in a matrix to form a large screen.

It is preferable for the cushioning member to be made of a transparent elastic material, and for the transparent elastic material to be an acrylic sheet or a urethane gel sheet, for example. It is preferable for the non-adhesive film to be a polyethylene terephthalate film (PET), triacetyl cellulose film (TAC), an acrylic film, or a polycarbonate film, for example.

It is preferable for the surface of the display panel on the display viewing side to be covered by a front covering part provided integrally with the light guide member, and for the surface of the light guide member on the display viewing side and a surface of the front covering part on the display viewing side to be connected by a smooth curved surface.

With the above configuration, the front covering part is provided integrally with the light guide member, and the surface of the light guide member on the display viewing side and a surface of the front covering part on the display viewing are connected by a smooth curved surface, and thus, there is no boundary line at the joint sections between light that passes through the light guide member and exits from the curved surface and light that exits from the surface further inside the light guide member. As a result, a display that is more natural for the audience will be visible.

A display device of the present invention has:
a display panel;
a casing that houses the display panel, a surface on a viewing side of the display panel including a window-frame part at a periphery of the display panel, a display image of the display panel viewable externally via a window defined by the window-frame part, the casing including the window-frame part that covers part of the display panel on the viewing side;
a light guide member covering a peripheral area of the surface on the viewing side of the display panel and covering a surface of the window-frame part, the light guide member guiding light for image display to outside of the display panel; and a cushioning member provided so as to extend along the light guide member and to cover an outer side face of the light guide member.

With the above configuration, the cushioning member is provided so as to extend along the light guide member and to cover an outer side face of the light guide member, and thus, combining these display devices together can result in a seamless multi-display system in which the light guide members being peeled off and the display panel being damaged is mitigated.

It is preferable for an outer edge of the light guide member to be positioned further inside a periphery of the casing than an outer side face of the casing, and for the cushioning member to be in contact with the outer edge of the light guide member and the surface of the window-frame part.

With the above configuration, an outer edge of the light guide member is positioned further inside a periphery of the casing than an outer side face of the casing, and thus, even if the cushioning member is between the respective light guide members and two of the display devices are arranged adjacent to each other, the distance between the display devices can be made smaller than if an outer edge of the light guide member is positioned further outside a periphery of the casing than an outer side face of the casing.

In the display device of the present invention, the light guide member may be a plano-convex lens including a first flat surface that faces the display panel side, a convex surface that bulges towards the display viewing side, and a second flat surface that forms an outer side face of the light guide member, and the cushioning member may cover the second flat surface.

The cushioning member may cover the entire convex surface and second flat surface.

The cushioning member may also cover the second flat surface and a portion of the convex surface.

In the display device of the present invention, it is preferable for the cushioning member to include a cushioning member part having adhesive characteristics, and a non-adhesive film covering a surface of the cushioning member part, the surface being opposite to the light guide member.

With the above configuration, even if the cushioning member part is made of a material having adhesive characteristics, the surface opposite to the light guide member is covered with the non-adhesive film, and thus, each display device can be dissembled again after the display devices are arranged in a matrix to form a large screen of a multi-display system.

It is preferable for the cushioning member to be made of a transparent elastic material, and for the transparent elastic material to be an acrylic sheet or a urethane gel sheet, for example. It is preferable for the non-adhesive film to be a polyethylene terephthalate film (PET), triacetyl cellulose film (TAC), an acrylic film, or a polycarbonate film, for example.

It is preferable for the surface of the display panel on the display viewing side to be covered by a front covering part provided in integration with the light guide member, and for the surface of the light guide member on the display viewing side and a surface of the front covering part on the display viewing side to be connected by a smooth curved surface.

With the above configuration, the front covering part is provided integrally with the light guide member, and the surface of the light guide member on the display viewing side and a surface of the front covering part on the display viewing side are connected by a smooth curved surface, and thus, there is no boundary line at the joint sections between light that passes through the light guide member and exits from the curved surface and light that exits from the surface further inside the light guide member. As a result, a display will be visible that is more natural for the audience.

Effects of the Invention

According to the present invention, the cushioning member is provided along the light guide member and between the respective light guide members of two adjacent display devices, and thus, even when the plurality of display devices are arranged in a matrix, the respective light guide members of the adjacent display devices are not in contact with each other. Therefore, the light guide members being peeled off and the display panel being damaged by stress being exerted on adhesive sections or the like between the light guide members can be mitigated.

DETAILED DESCRIPTION OF EMBODIMENTS

Figure 1:
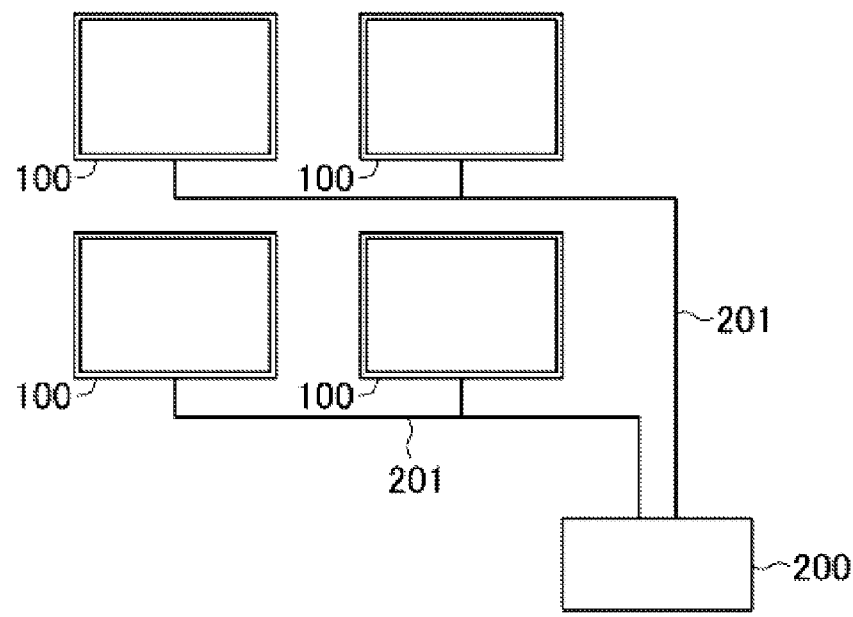
FIG. 1 is a schematic image view of an entire configuration of a multi-display system.

Embodiments of the present invention will be illustratively explained below. The present invention is not limited to the embodiments below. In the drawings, identical or corresponding configurations may be shown with identical reference characters.

Embodiment 1

Multi-Display System

FIG. 1 is a schematic image view of a multi-display system 10. The multi-display system 10 is used for digital signage or the like that performs large-screen display, for example.

The multi-display system 10 has a plurality of display devices 100 (4 in FIG. 1) and a managing part 200. The managing part 200 communicates with each of the display devices 100 via networks 201. The managing part 200 functions to transmit display content to each of the display devices 100, and to perform display mode switching for the display devices 100. Each of the display devices 100 may be connected in rows as shown in FIG. 1, or connected in a straight line by a GPIB (General Purpose Interface Bus) or the like.

Figure 2:
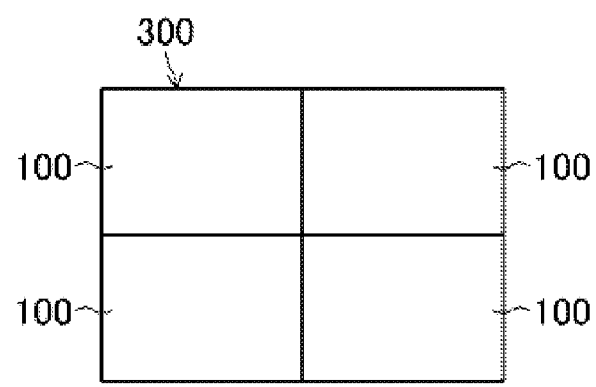
FIG. 2 is a view showing an assembled state of the multi-display system.

FIG. 2 shows a state in which the plurality of display devices 100 have been integrally assembled. The plurality of display devices 100 altogether form a large-screen display 300. On the basis of instructions from the managing part 200, each of the display devices 100 may enlarge part of an image and then display the image so as to form a single image on the large-screen display 300. Each of the display devices 100 may also display the same image, without enlarging the image (basically, displaying four images in tile shapes). Each of the display devices 100 may also display different images.

(Display Device)

Figure 3:
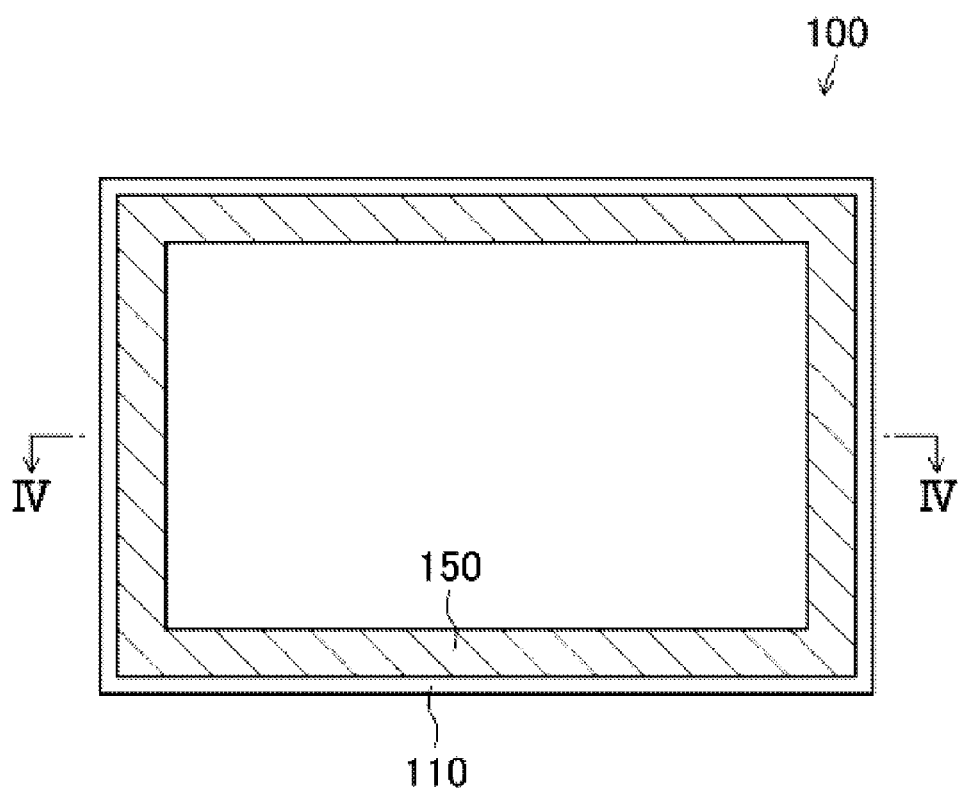
FIG. 3 is a schematic plan view of a display device according to Embodiment 1.
Figure 4:
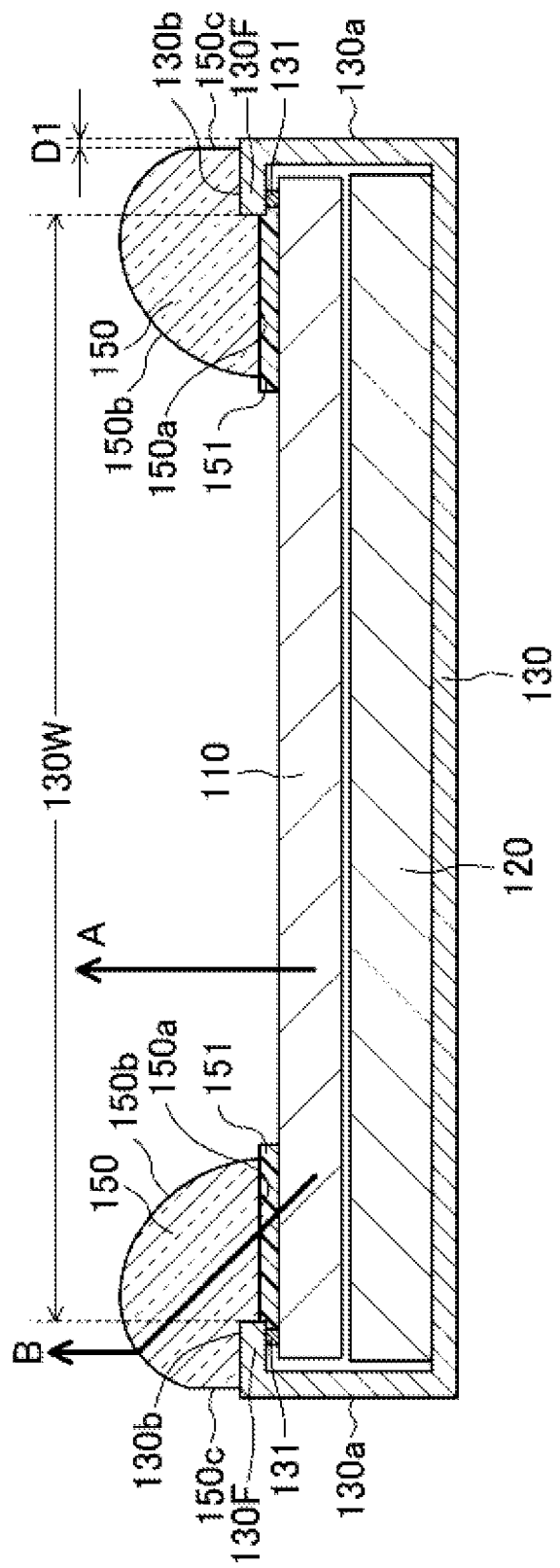
FIG. 4 is a cross-sectional view along the line IV-IV in FIG. 3.

FIGS. 3 and 4 are a schematic plan view and a cross-sectional view of the display device 100, respectively. The display device 100 is provided with: a display panel 110 that performs image display; a backlight unit 120 that irradiates the display panel 110 with light; a casing 130 that houses the display panel 110 and backlight unit 120; and a light guide member 150 provided on the periphery of the display panel 110. In FIG. 3, the areas of the light guide member 150 are shown by slanted lines.

The display panel 110 has two substrates (not shown) arranged facing each other, and a frame-shaped sealing material is provided between the peripheries thereof. A liquid crystal layer is provided in the region between the substrates surrounded by the sealing material to entirely form a liquid crystal display panel. A polarizing plate is provided on each of the two substrates on the surface that is opposite to the liquid crystal layer. The display panel 110 has an approximately 60-inch display with a vertical length of 747 mm and a horizontal length of 1328 mm.

The backlight unit 120 is arranged so as to face the surface that is opposite to the display viewing side of the display panel 110. The backlight unit 120, although not shown, has a light source such as a cold-cathode fluorescent lamp or LEDs (Light Emitting Diodes), a light guide plate that guides light from the light source to the display panel 110, and a diffusion plate, for example. When the light guided by the light guide plate to the display panel 110 passes through the liquid crystal layer, the orientation direction of the liquid crystal molecules adjusts the transmittance of the light, and an image can be viewed when the light is emitted from the substrate of the display viewing side.

The casing, although not shown, is constituted of a front casing part that houses the display panel 110 and a back casing part that supports the backlight unit 120. The surface of the casing 130 on the display viewing side acts as a window-frame part 130F on the periphery of the display panel 110, and the portion surrounded by the window-frame part 130F forms a window section 130W. The display panel 110 is located inside the casing 130 such that a display image can be viewed externally via the window section 130W. A frame-shaped spacer 131 is formed along the periphery of the display viewing surface of the display panel 110, and this spacer 131 binds the display panel 110 and the inside of the casing 130 together.

The light guide member 150 is provided in a frame-shape on the periphery of the display viewing surface of the display panel 110. The light guide member 150 is a plano-convex lens that has a first flat surface 150a facing the display panel 110 side, a curved surface 150b bulging towards the display viewing side, and a second flat surface 150c that forms an outer side face of the light guide member 150. The light guide member 150 is formed from a transparent insulating material such as an acrylic resin, for example. The light guide member 150 has a width of 10 to 100 mm and a thickness of 10 to 30 mm, for example. The light guide member 150 is bonded to the surface of the display panel 110 at the first flat surface 150a by an adhesive 151 such as an ultraviolet curable resin or a thermosetting resin.

The outer side face 150c of the light guide member 150 is positioned further towards the inner side periphery than an outer side face 130a of the casing 130. A distance D1 between the outer side face 150c of the light guide member and the outer side face 130a of the casing 130 is approximately 0.2 to 0.5 mm, for example.

The light for image display on the display panel 110 is, on average, emitted perpendicularly to the display panel 110 in an area where the light guide member 150 is provided, as shown by the arrow A in FIG. 4. However, the light guide member 150 being provided in a frame-shape at the periphery of the display panel 110 on the display viewing side causes light on the periphery of the display panel 110 to refract on the curved surface of the light guide member 150 when the light passes through the light guide member 150, as shown by arrow B in FIG. 4. The light then progresses towards the outside of the display panel 110. Accordingly, when a plurality of the display devices 100 are used to form the multi-display system 10 having the large-screen display 300 in order to enlarge the display of an image, the light for image display that hits the peripheries is guided towards the outside of the display panel 110, and display at the seams of each display device 100 becomes harder to see.

This display device 100 is possible to manufacture using conventional well-known methods and the like.

(Large-Screen Display)

Figure 5:
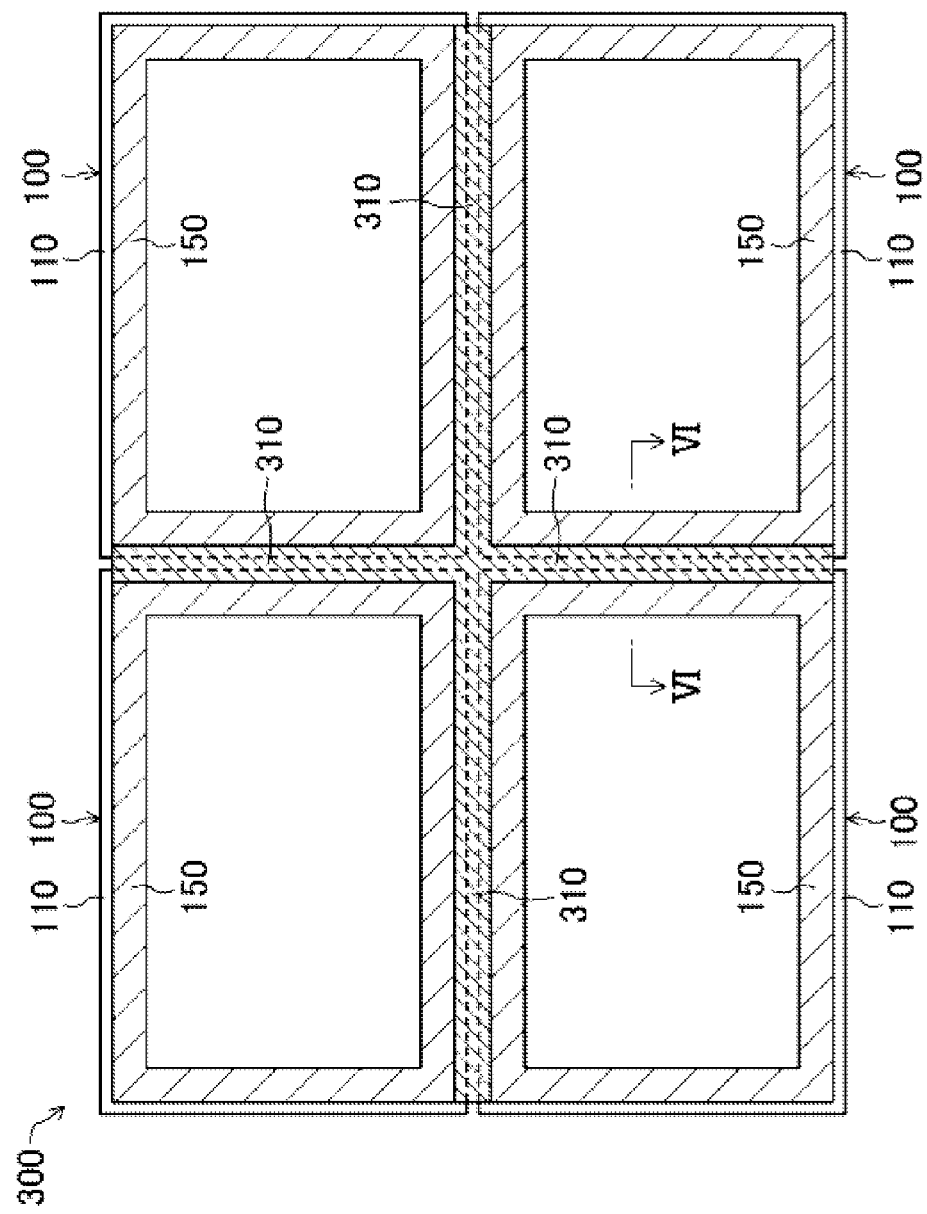
FIG. 5 is a schematic plan view of a large-screen display in Embodiment 1.
Figure 6:
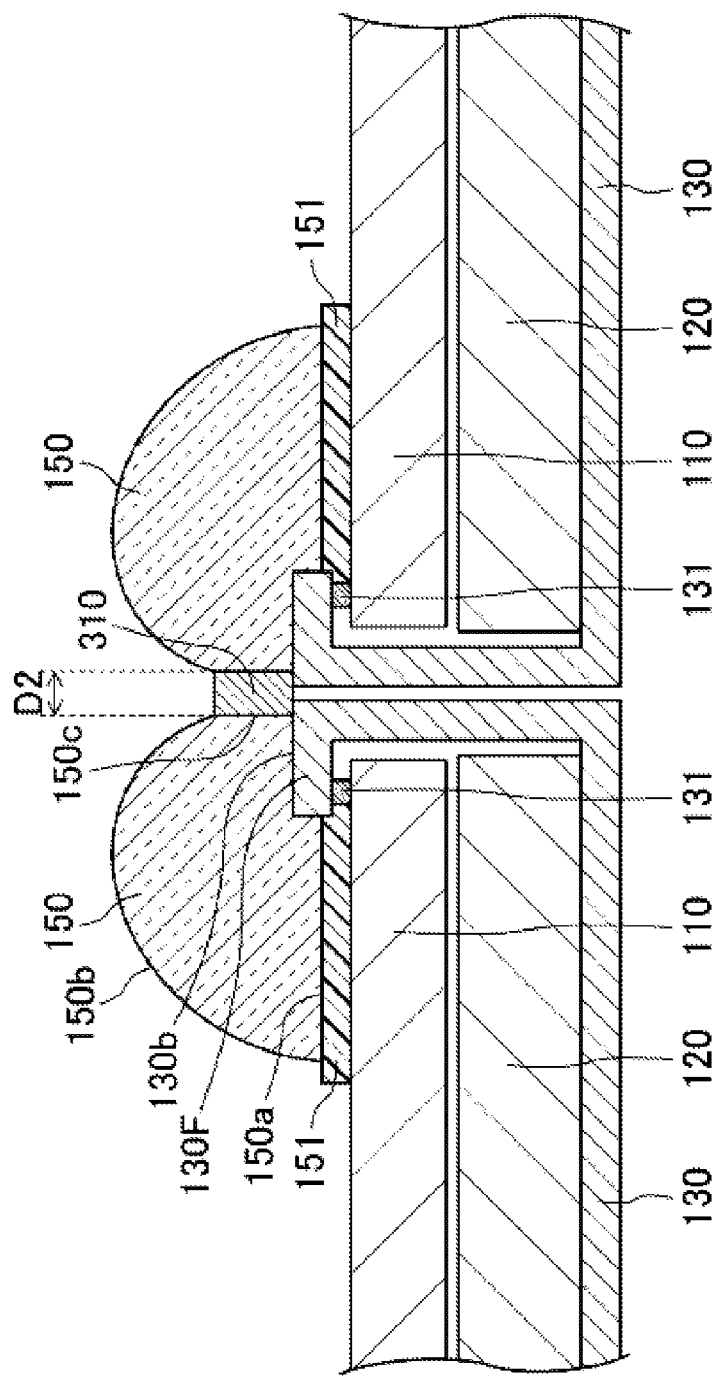
FIG. 6 is a cross-sectional view along the line VI-VI in FIG. 5.
Figure 7:
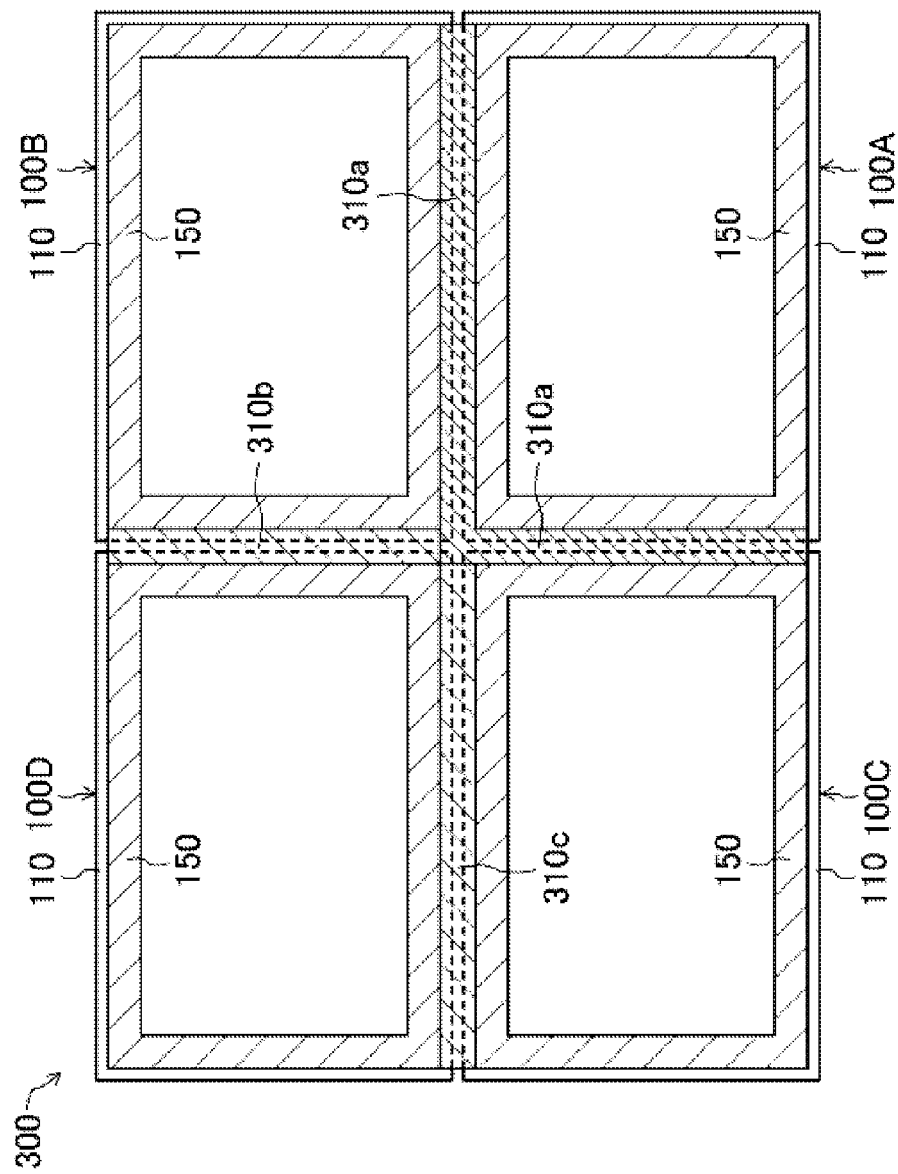
FIG. 7 is a view showing the assembled state of the large-screen display in Embodiment 1.
Figure 10:
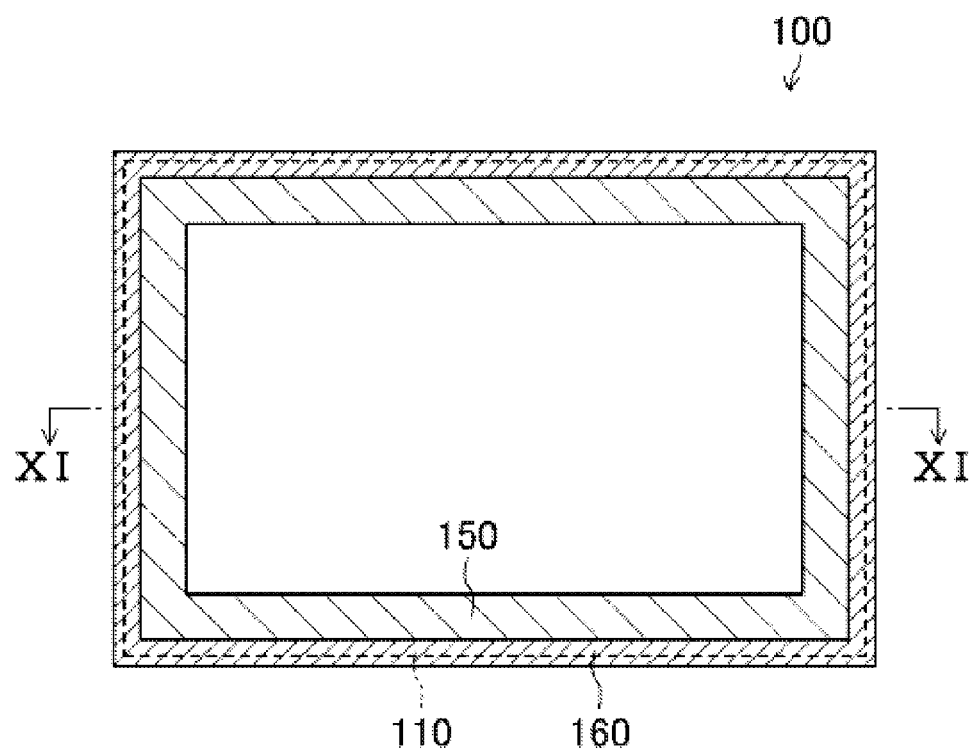
FIG. 10 is a schematic plan view of a display device according to Embodiment 2.
Figure 12:
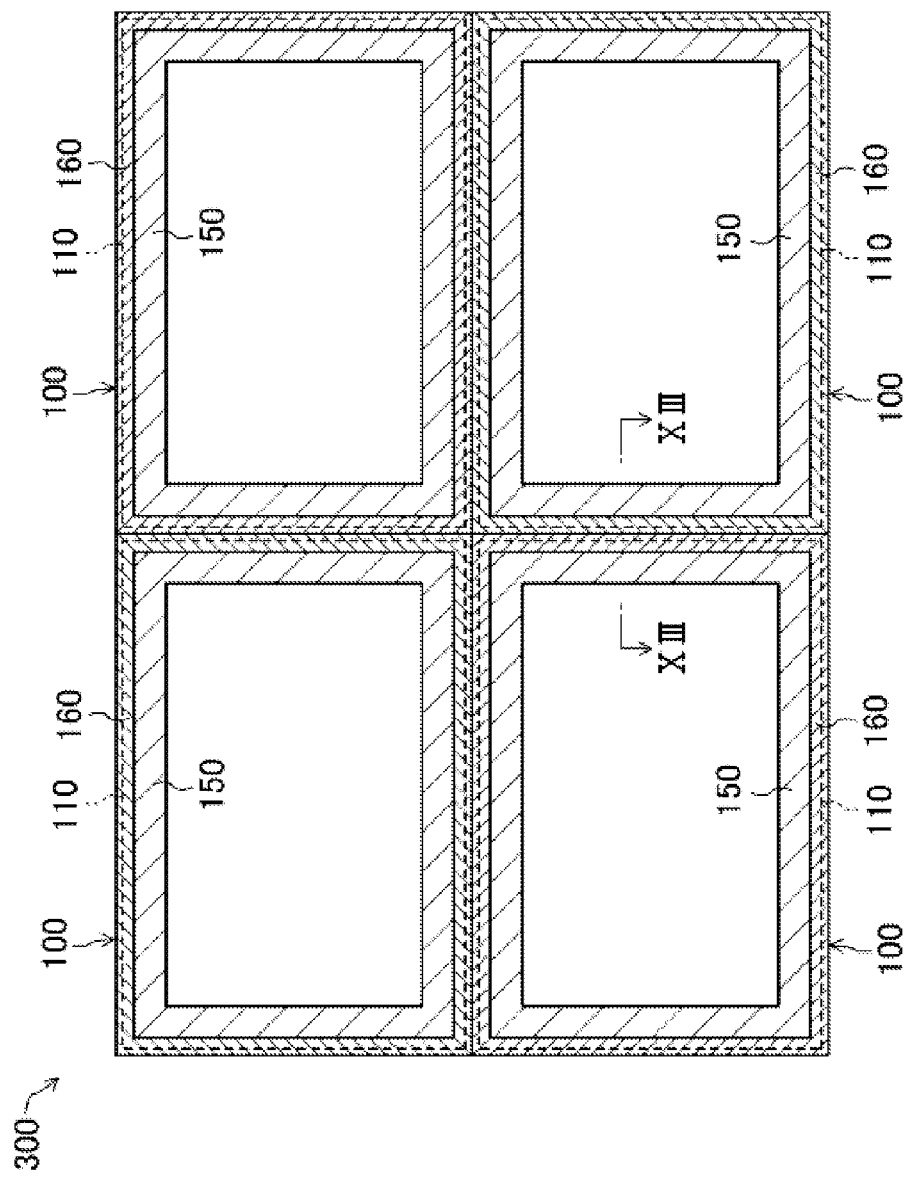
FIG. 12 is a schematic plan view of a large-screen display in Embodiment 2.

Four display devices 100 of the above configurations will be used to assemble the large-screen display 300 of the multi-display system 10, as described above. FIGS. 5 and 6 show a schematic plan view of the large-screen display 300 and a cross-sectional view along the line VI-VI in FIG. 5, respectively. In FIG. 5, areas of the light guide members 150 and areas of a cushioning member 310 are each shown with slanted lines (FIGS. 7, 10, and 12 below are the same).

The four display devices 100 are arranged in a matrix with two rows and two columns. The respective light guide members 150 are positioned in parallel on boundary sections of the adjacent display devices 100, and the cushioning member 310 is placed between the light guide members 150. The cushioning member 310 is disposed so as to extend along the light guide members 150. The cushioning member 310 is disposed so as to be in contact with the outer side faces 150c of the light guide members 150 and the surfaces 130b of the window-frame parts 130F. A distance D2 between the adjacent light guide members 150 is approximately 0.6 to 1.5 mm, for example.

The cushioning member 310 is a softer material than the acrylic resin that forms the light guide member 150. The cushioning member 310 is made of a transparent elastic material. It is preferable for the cushioning member 310 to have adhesive characteristics, which makes it possible to adhere the respective adjacent light guide members 150 of the display devices 100 to each other. It is preferable for the cushioning member 310 to have the same refractive index as the light guide member 150, or to be a material with a small difference therefrom in the refractive index, such as approximately 1.5, for example. It is preferable for the transparent elastic material constituting such a cushioning member 310 to be an acrylic gel sheet, a urethane gel sheet, or the like. An acrylic gel sheet is a sheet-shaped acrylic gel that has been turned into a gel with polyacrylic acid ester as a main component. The "300Z" series made by KGK Kyodo Giken Chemical Co., Ltd. can be suitably used for the acrylic gel sheet, for example. The urethane gel sheet is gel-like polyurethane formed into a sheet. "SAB (thick-film adhesive sheet)" made by Toray Advanced Film Co., Ltd. can be suitably used for the urethane gel sheet, for example. A silicone rubber, silicone gel sheet, styrene-based gel sheet, or the like can also be used for the material of the cushioning member 310 in addition to the acrylic gel sheet and urethane gel sheet.

A method of assembling the large-screen display 300 will be explained using FIG. 7. For convenience of explanation, the four display devices 100 are 100A, 100B, 100C, and 100D, respectively.

First, a cushioning member 310a is attached in an L-shape along two adjacent sides of the first display device 100A. Then, the display devices 100B and 100C are placed on the respective adjacent sides so as to enclose the cushioning member 310a. A cushioning member 310b is attached to a side of the display device 100B close to where the display device 100D will be placed, and a cushioning member 310c is attached to a side of the display device 100C close to where the display device 100D will be placed. The final display device 100D is placed so as to enclose the cushioning member 310b and 310c. These display devices 100A, 100B, 100C, and 100D are externally attached by an attaching method to form the large-screen display 300.

Effects of Embodiment 1

According to the multi-display system 10 with the above configuration, the cushioning member 310 is placed between the respective light guide members 150 and along these light guide members 150 at the boundary section of the two adjacent display devices 100, and thus, even if a plurality of the display devices 100 are arranged in a matrix, the respective light guide members 150 of the adjacent display devices 100 are not in contact with each other. In other words, even if two of the light guide members 150 are placed adjacent to each other, the cushioning member 310 placed between the light guide members 150 is shock-absorbing, and therefore, the light guide members 150 being peeled off and the display panel 110 being damaged by stress being exerted on the adhesive section or the like between the light guide members 150 is mitigated.

Modification Examples for Embodiment 1

Figure 8:
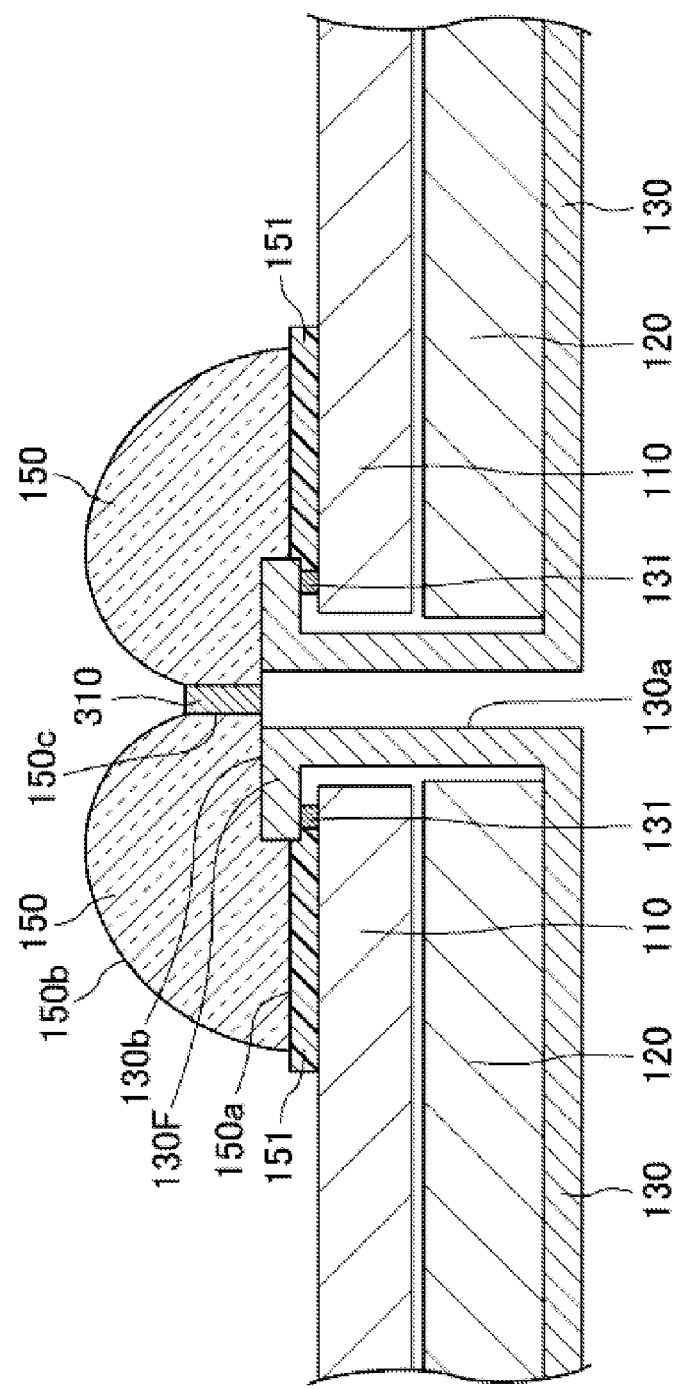
FIG. 8 is a cross-sectional view of a joint section of a large-screen display in Modification Example 1.
Figure 9:
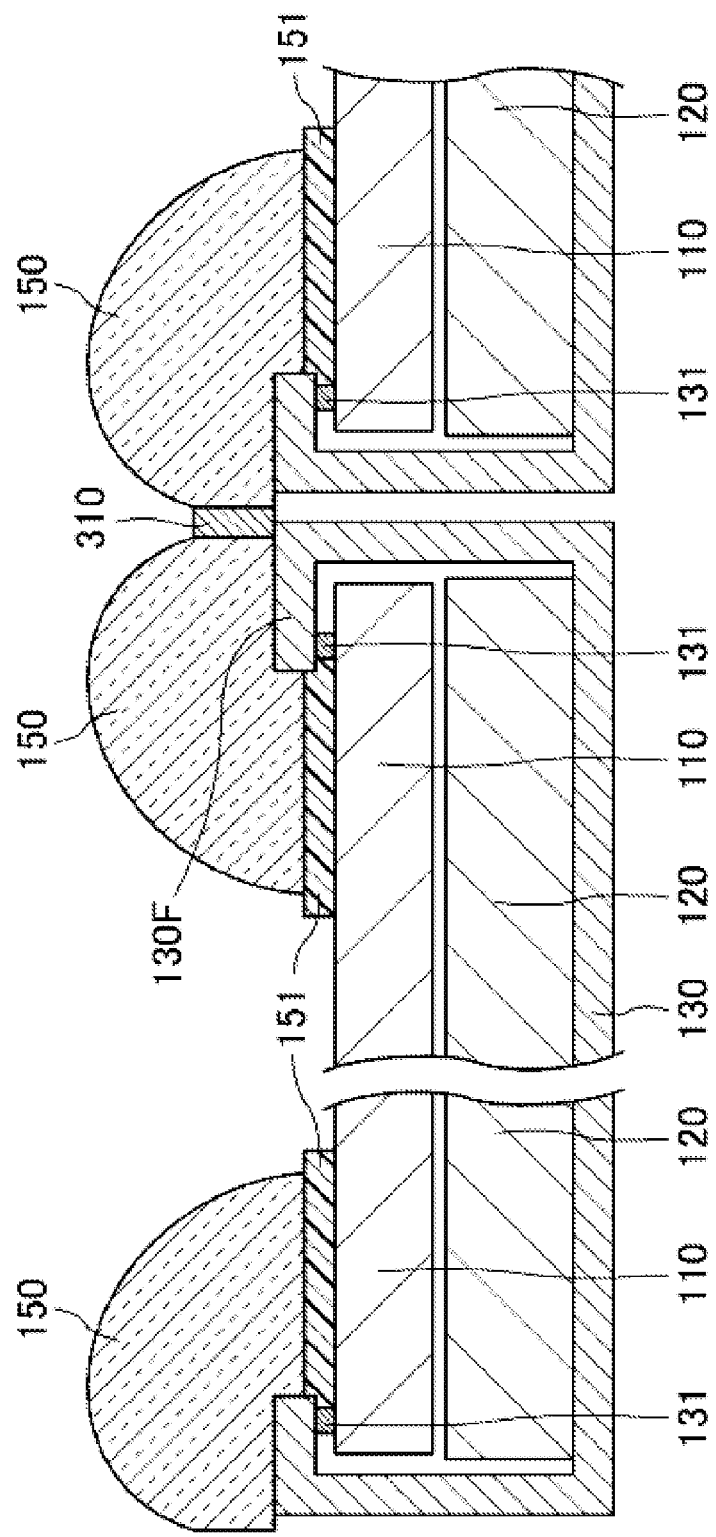
FIG. 9 is a cross-sectional view of a large-screen display in Modification Example 2.

In Embodiment 1, the outer side face 150c of the light guide member 150 is positioned further towards the inner side periphery than an outer side face 130a of the casing 130; however, as shown by Modification Example 1 in FIG. 8, the outer side face 150c of the light guide member 150 may be positioned further out than the outer side face 130a of the casing 130. When frame regions of the display panel 110 are different depending on the respective area of the display panel 110, then as shown by Modification Example 2 in FIG. 9, in large frame areas (the right side of the left display panel 110 in FIG. 9) the outer side face 150c of the light guide member 150 may be positioned further in on the casing 130 than the outer side face 130a of the casing 130, and in small frame areas (the left side of the right display panel 110 and the left side of the left display panel 110 in FIG. 9) the outer side face 150c of the light guide member 150 may be positioned further outside than the outer side face 130a of the casing 130.

In Embodiment 1, a plano-convex lens having the first flat surface 150a of the light guide member 150 facing the display panel 110, the curved surface 150b bulging towards the display viewing side, and the second flat surface 150c forming the outer side face of the light guide member 150 was explained. However, the light guide member 150 may be a plano-convex lens that has the flat surface 150a facing the display panel 110 and the curved surface 150b bulging towards the display viewing side (in other words, the outer side face of the light guide member 150 is not the flat surface but rather a portion of the curved surface 150b). However, in consideration of arranging the adjacent display devices 100 together in a seamless matrix, it is preferable that the outer side face of the light guide member 150 be a flat surface.

In Embodiment 1, the light guide member 150 being disposed covering the periphery of the display panel surface in a frame-shape was explained. However, the light guide member 150 may be disposed on areas adjacent to the other display devices 100 among the peripheries of the display panels 110 when combining a plurality of the display devices 100 to form the large-screen display 300.

Embodiment 2

Multi-Display System

Next, a multi-display system 10 according to Embodiment 2 of the present invention will be explained. The multi-display system 10, in a manner similar to Embodiment 1, has a plurality of display devices 100 and a managing part 200, and the plurality of display devices 100 are combined in a matrix to form a large-screen display 300.

(Display Device)

Figure 11:
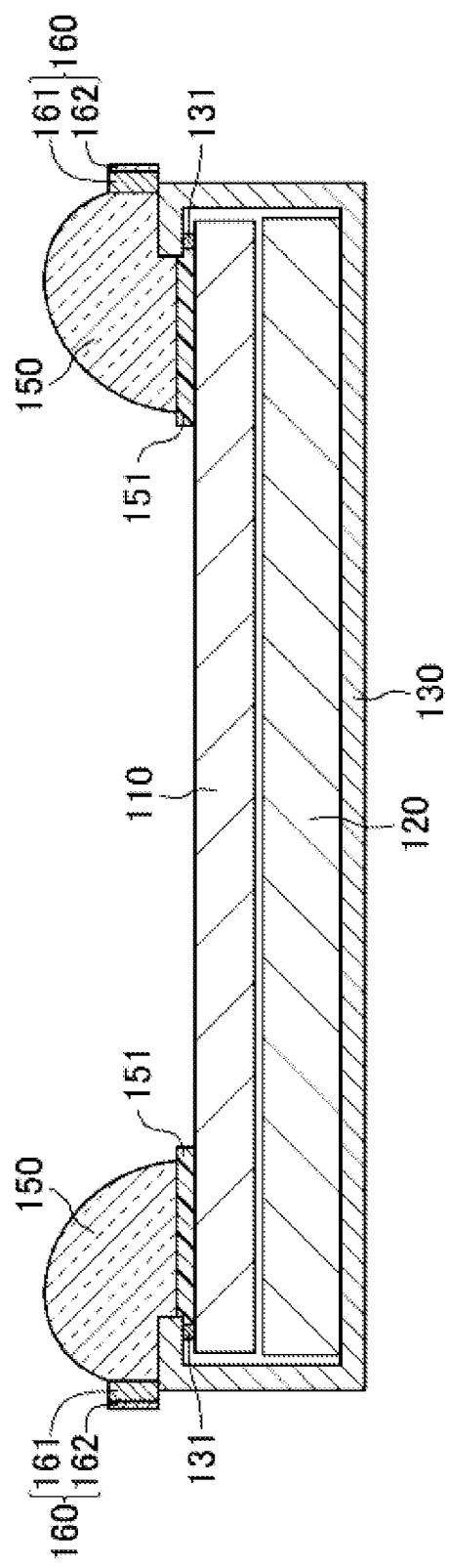
FIG. 11 is a cross-sectional view of FIG. 10 along the line XI-XI.

FIGS. 10 and 11 are a schematic plan view and a cross-sectional view of the display device 100, respectively. The display device 100 is provided with: a display panel 110 that performs image display; a backlight unit 120 that irradiates the display panel 110 with light; a casing 130 that houses the display panel 110 and backlight unit 120; a light guide member 150 provided on the periphery of the display panel 110; and a cushioning member 160 that covers the outer side face of the light guide member 150.

The cushioning member 160 has a configuration in which a cushioning member part 161 close to the light guide member 150 and a non-adhesive film 162 covering a surface thereof are stacked together. The cushioning member 160 is disposed so as to cover a second flat surface 150c, which is the outer side face of the light guide member 150, and so as to extend in a loop along the light guide member 150. The cushioning member 160 is disposed so as to be in contact with a surface 130b of a window-frame part 130F of the casing 130. The surface of the cushioning member part 161 is covered by the non-adhesive film 162, and thus, other material is prevented from attaching to the cushioning member 160.

The cushioning member part 161 has adhesive characteristics and is a softer material than the acrylic resin that forms the light guide member 150. The cushioning member part 161 is made of a transparent elastic material. It is preferable for the cushioning member part 161 to have the same refractive index as the light guide member 150, or to be a material with a small difference therefrom in the refractive index, such as approximately 1.5, for example. It is preferable for the transparent elastic material constituting such a cushioning member part 161 to be an acrylic gel sheet, a urethane gel sheet, or the like. An acrylic gel sheet is a sheet-shaped acrylic gel that has been turned into a gel with polyacrylic acid ester as a main component. The "300Z" series made by KGK Kyodo Giken Chemical Co., Ltd. can be suitably used for the acrylic gel sheet, for example. The urethane gel sheet is gel-like polyurethane formed into a sheet. "SAB (thick-film adhesive sheet)" made by Toray Engineering Co., Ltd. can be suitably used for the urethane gel sheet, for example. A silicone rubber, silicone gel sheet, styrene-based gel sheet, or the like can also be used for the material of the cushioning member part 161 in addition to the acrylic gel sheet and urethane gel sheet. The cushioning member part 161 has a thickness of 300 to 700 µm, for example.

Examples of the non-adhesive film 162 include a polyethylene terephthalate (PET) film, triacetyl cellulose (TAC) film, acrylic film, polycarbonate film, and the like. The non-adhesive film 162 has a thickness of 50 to 100 µm, for example.

Except for the cushioning member 160, the rest is the same configuration as Embodiment 1.

This display device 100 can be created by attaching the cushioning member 160 to the outer side face 150c of the light guide member 150 of a display device made using conventional well-known methods or the like. The cushioning member 160 may be attached to the outer side face 150c of the light guide member 150 before attaching the light guide member 150 to the display panel 110, or the cushioning member 160 may be attached to the outer side face 150c of the light guide member 150 after attaching the light guide member 150 to the display panel 110.

Figure 13:
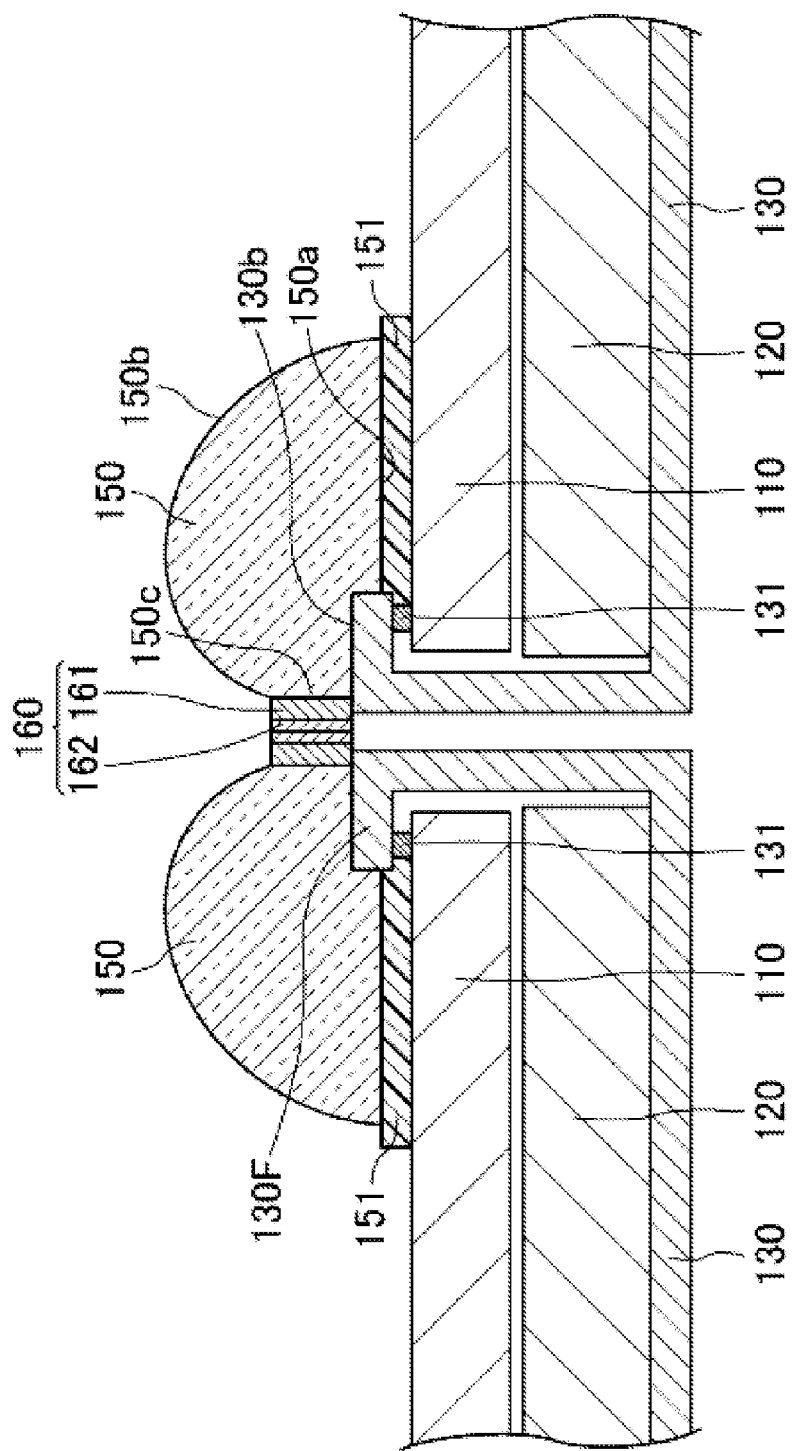
FIG. 13 is a cross-sectional view along the line XIII-XIII in FIG. 12.

As shown in FIG. 12, the large-screen display 300 is configured by display devices 100 of the above configuration being arranged in a matrix and being attached by an external attaching method. At this time, as shown in FIG. 13, the cushioning member 160 is present between the two light guide members positioned in parallel at the boundary section of the adjacent display devices 100. The respective cushioning members 160 of the adjacent display devices 100 have non-adhesive films 162 in contact with each other.

Effects of Embodiment 2

According to the multi-display system 10 with the above configuration, the cushioning member 160 is placed between the respective light guide members 150 and along these light guide members 150 at the boundary section of the two adjacent display devices 100, and thus, even if a plurality of the display devices 100 are placed in a matrix, the respective light guide members 150 of the adjacent display devices 100 are not in contact with each other. In other words, even if the two light guide members 150 are placed adjacent to each other, the respective cushioning member parts 161 of the two cushioning members 160 placed between the light guide members 150 are shock-absorbing, and therefore, the light guide members 150 being peeled off and the display panel 110 being damaged due to stress exerted on the adhesive section or the like between the light guide members 150 is mitigated.

According to the multi-display system 10 with the above configuration, the cushioning member 160 is provided on each display device 100, and thus, the respective display devices 100 can be combined together to form the large-screen display 300 of the multi-display system 10 with ease. The cushioning member 160 of the display device 100 has the non-adhesive film 162 covering the surface of the cushioning member part 161, and therefore, the assembled large-screen display 300 can be disassembled and made into a plurality of the display devices 100 with ease and without the cushioning member 160 of the adjacent display devices 100 attaching to each other.

Modification Examples for Embodiment 2

Figure 14:
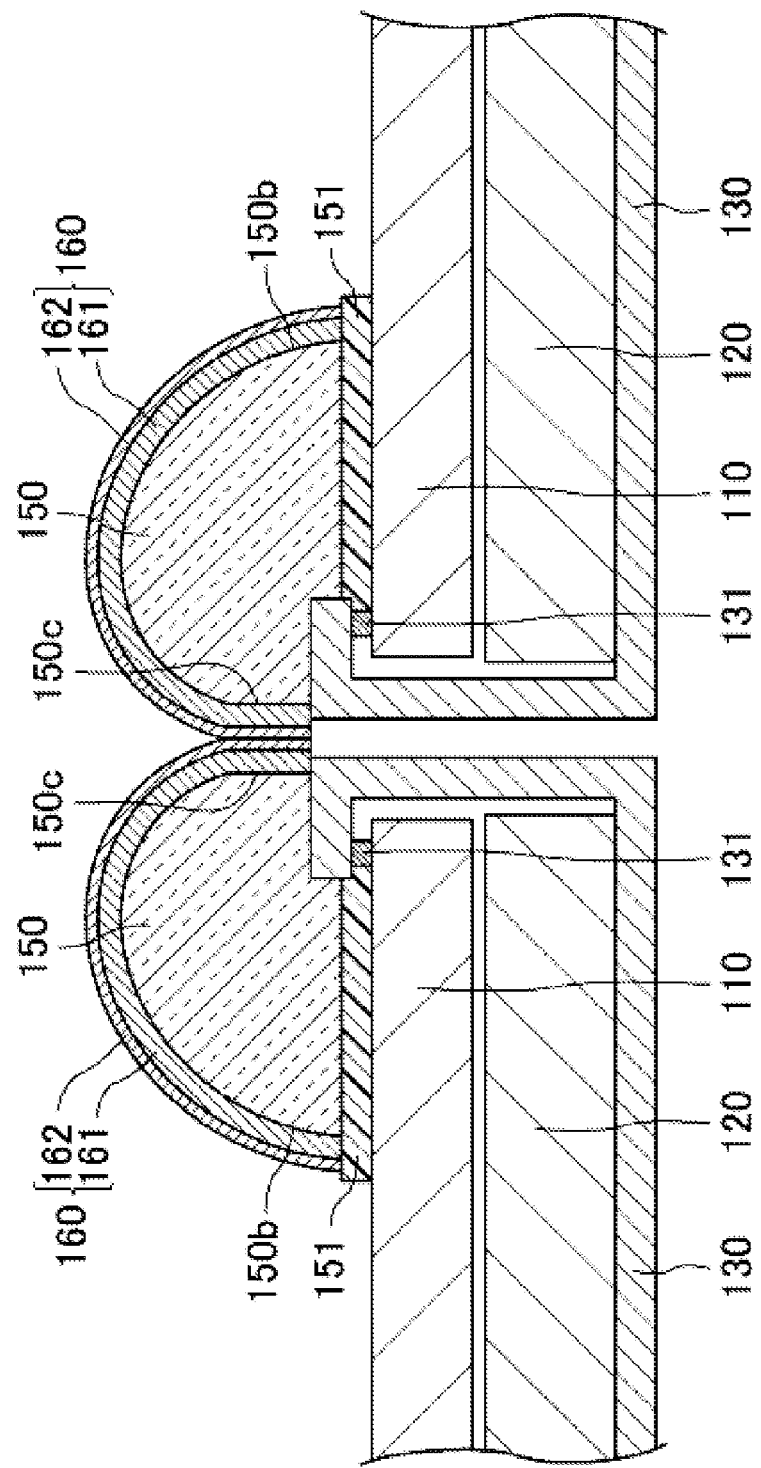
FIG. 14 is a cross-sectional view of a joint section of a large-screen display in Modification Example 3.
Figure 15:
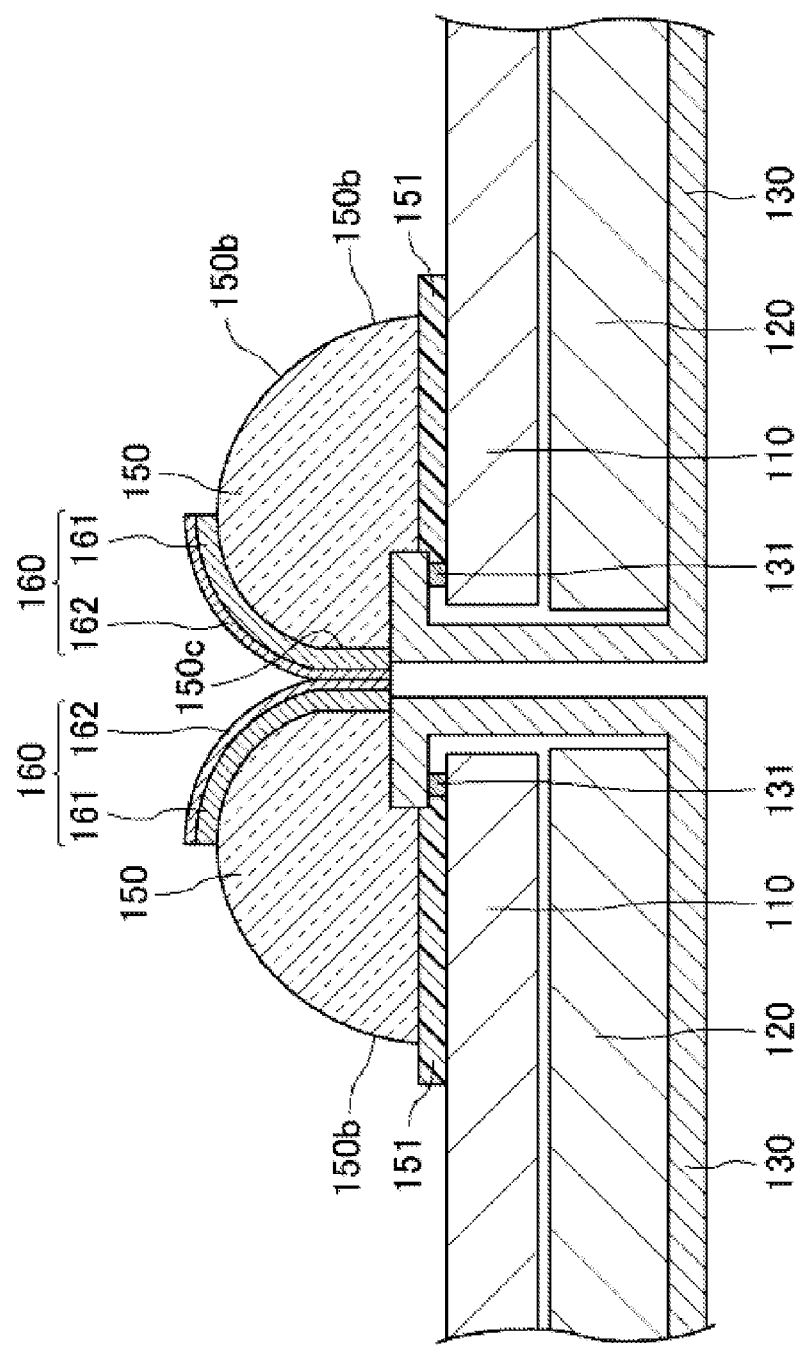
FIG. 15 is a cross-sectional view of a joint section of a large-screen display in Modification Example 4.

In Embodiment 2, the cushioning member 160 being disposed covering the second flat surface 150c was explained. However, as shown by Modification Example 3 in FIG. 14, the cushioning member 160 may further be disposed to cover the entire curved surface 150b of the light guide member 150, and as shown by Modification Example 4 in FIG. 15, the cushioning member 160 may be disposed to cover a portion of the curved surface 150b of the light guide member 150 and the second flat surface 150c. By providing the cushioning member 160 as in Modification Examples 2 and 3, the refraction of light of the cushioning member 160 at the boundary of the light guide members 150 is uniform, and excellent viewing characteristics are obtained. In particular, when the cushioning member 160 covers the entire surface of the light guide member 150 as in Modification Example 2, excellent viewing characteristics are obtained because there are no seams on the display viewing side of the light guide members 150 between areas where the cushioning member is present and areas where the cushioning member is absent.

Embodiment 3

Multi-Display System

Next, a multi-display system 10 according to Embodiment 3 of the present invention will be explained. The multi-display system 10, in a manner similar to Embodiment 1, has a plurality of display devices 100 and a managing part 200, and the plurality of display devices 100 are combined in a matrix to form a large-screen display 300.

(Display Device)

Figure 16:
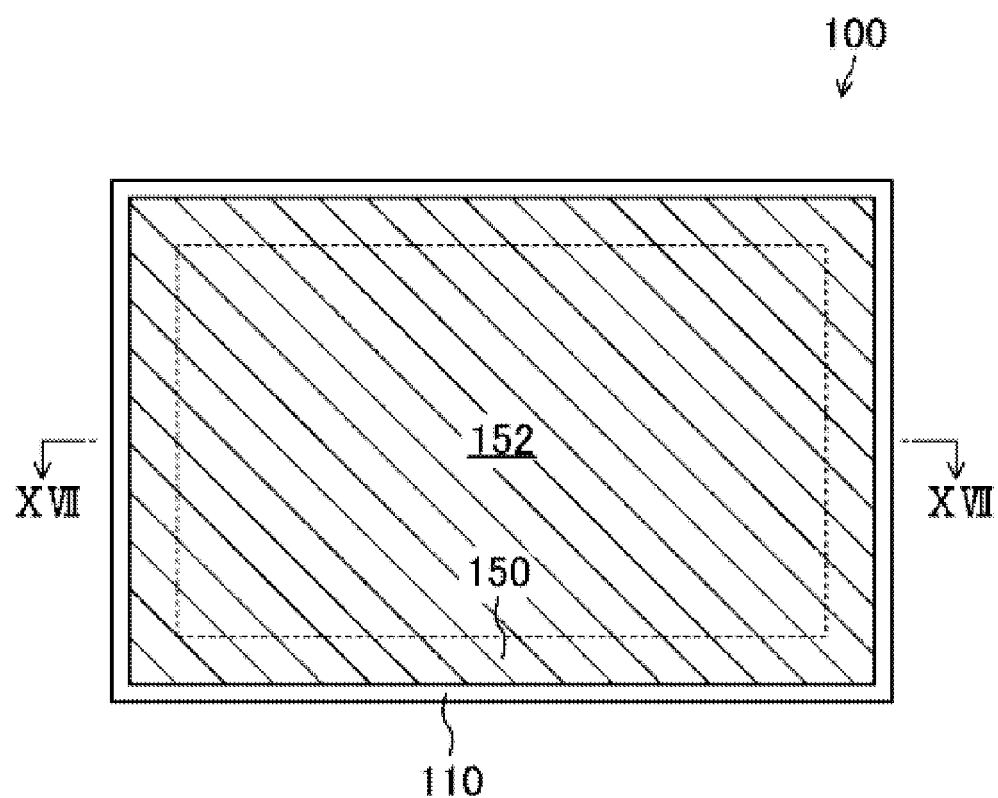
FIG. 16 is a schematic plan view of a display device according to Embodiment 2.
Figure 17:
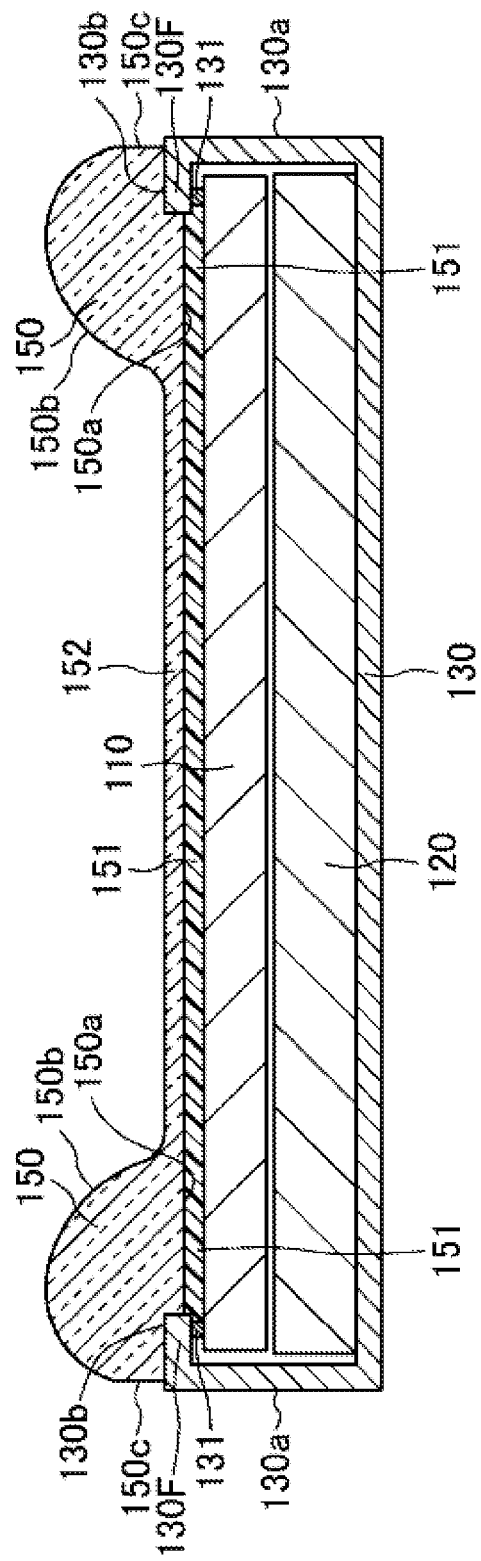
FIG. 17 is a cross-sectional view along the line XVII-XVII in FIG. 16.

FIGS. 16 and 17 are a schematic plan view and a cross-sectional view of the display device 100, respectively. The display device 100 is provided with: a display panel 110 that performs image display; a backlight unit 120 that irradiates the display panel 110 with light; a casing 130 that houses the display panel 110 and backlight unit 120; a light guide member 150 provided on the periphery of the display panel 110; and a front covering part 152 that covers the surface of the display viewing side of the display panel 110.

Figure 18:
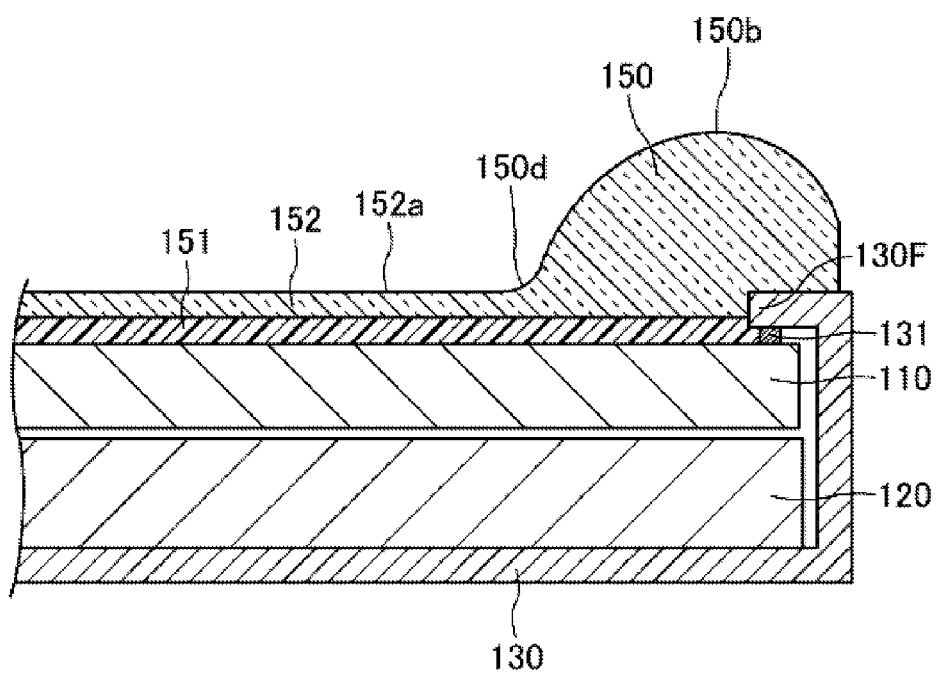
FIG. 18 is an enlarged cross-sectional view of a main part of FIG. 17.

The front covering part 152 is integrated with the light guide member 150. The joint sections between the light guide member 150 and the front covering part 152 are connected in smooth curves in the cross-section. In other words, as shown by the magnified view in FIG. 18, the curved surface 150b that bulges towards the display viewing side of the light guide member 150 and a surface 152a of the front covering part 152 close to the display viewing side are connected by a curved surface 150d. The front covering part 152 has a thickness of 0.5 to 5 mm, for example.

The light guide member 150 and front covering part 152 are formed in integration so as to assume the form explained above, and are then attached to the surface of the display panel 110 by an adhesive 151.

Except for the light guide member 150 and the front covering part 152, the rest of the configuration is the same as Embodiment 1.

(Large-Screen Display)

As in Embodiment 1, four display devices 100 of the above configurations can be arranged, placing a cushioning member 310 between the adjacent light guide members 150, and thereby assembling the large-screen display 300 of the multi-display system 10.

According to the multi-display system 10 with the above configuration, the cushioning member 310 is placed between the respective light guide members 150 and along these light guide members 150 at the two adjacent display devices 100, and thus, even if a plurality of the display devices 100 are placed in a matrix, the respective light guide members 150 of the adjacent display devices 100 are not in contact with each other. In other words, even if the two light guide members 150 are placed adjacent to each other, the cushioning member 310 placed between the light guide members 150 is shock-absorbing, and therefore, the light guide members 150 being peeled off and the display panel 110 being damaged due to stress being exerted on the adhesive section or the like between the light guide members 150 is mitigated.

The display device 100 of the present embodiment is provided with the front covering part 152 formed in integration with the light guide member 150, and the curved surface 150b bulging towards the display viewing side of the light guide member 150, and the surface 152 of the front covering part 152 close to the display viewing side are connected by a smooth curved surface 150d. Therefore, there is no boundary line at the joint sections between light that passes through the light guide member 150 and exits from the curved surface 150b and light that exits from the surface 152a further inside the light guide member 150. As a result, a display that is more natural for the audience will be visible.

The display device 100 of the present embodiment has the surface thereof covered by the front covering part 152, and therefore, the physical strength of the display panel 110 is higher.

Other Embodiments

In the embodiments and modification examples described above, a liquid crystal display device was shown as a display device 100, but without being limited thereto, the liquid crystal display device may be an organic EL display device, an inorganic EL display device, an electronic portal imaging device, a plasma display (PD), a plasma addressed liquid crystal display (PALC), a field emission display (FED), a surface-conduction electron-emitter display (SED), or the like. The display device 100 may also have a drive system of the display panel 110 that is a field-sequential color type.

INDUSTRIAL APPLICABILITY

The present invention is useful for a display device, and a multi-display system that displays seamless images using this display device.

DESCRIPTION OF REFERENCE CHARACTERS 10 multi-display system
100 display device
110 display panel
130 casing
130a outer side face of casing
130b surface of window frame part
130F window frame part
130W window section
150 light guide member
150a first flat surface
150b curved surface 150c second flat surface (outer side face of light guide member)
160 cushioning member
161 cushioning member part
162 non-adhesive film
310 cushioning member

The invention claimed is:

1. A multi-display system, comprising:
a plurality of display devices, each display device including:
  a display panel;
  a casing that houses the display panel, a surface on a viewing side of the display panel including a window-frame part at a periphery of the display panel, a display image of the display panel viewable externally via a window defined by the window-frame part, the casing including the window-frame part that covers part of the display panel on the viewing side; and
  a light guide member covering a peripheral area of the surface on the viewing side of the display panel and covering a surface of the window-frame part, the light guide member guiding light for image display to outside of the display panel,
wherein the plurality of display devices are arranged in a matrix such that a cushioning member is arranged along the light guide member, the cushioning member being sandwiched between the respective light guide members of two adjacent display devices of the plurality of display devices,
wherein in each display device, an outer edge of the light guide member is positioned further inside a periphery of the casing than an outer side face of the casing,
wherein the cushioning member is in contact with the outer edge of the light guide member and the surface of the window-frame part,
wherein the cushioning member is made of a transparent elastic material that is an acrylic gel sheet or a urethane gel sheet, and
wherein a distance between the respective light guide members of two adjacent display devices that sandwich the cushioning member is approximately 0.6 mm to 1.5 mm.

2. The multi-display system according to claim 1,
wherein the surface of the display panel on the display viewing side is covered by a front covering part provided integrally with the light guide member, and
wherein the surface of the light guide member on the display viewing side and a surface of the front covering part on the display viewing side are connected by a smooth curved surface.

3. A multi-display system, comprising:
a plurality of display devices, each display device including:
  a display panel;
  a casing that houses the display panel, a surface on a viewing side of the display panel including a window-frame part at a periphery of the display panel, a display image of the display panel viewable externally via a window defined by the window frame part, the casing including the window-frame part that covers part of the display panel on the viewing side;
  a light guide member covering a peripheral area of the surface on the viewing side of the display panel and covering a surface of the window-frame part, the light guide member guiding light for image display to outside of the display panel; and
  a cushioning member provided so as to extend along the light guide member and to cover an outer side face of the light guide member,
wherein the plurality of display devices are arranged in a matrix such that the respective cushioning members are arranged and sandwiched between the respective light guide members of two adjacent display devices of the plurality of display devices,
where in each display device, an outer edge of the light guide member is positioned further inside a periphery of the casing than an outer side face of the casing,
wherein the cushioning member is in contact with the outer edge of the light guide member and the surface of the window-frame part,
wherein the cushioning member includes a cushioning member part made of a transparent elastic material that is an acrylic gel sheet or an urethane gel sheet, and
wherein a thickness of the cushioning member part in each cushioning member is 300 to 700 μm.

4. The multi-display system according to claim 3,
wherein the light guide member is a plano-convex lens including a first flat surface that faces the display panel side, a convex surface that bulges towards the display viewing side, and a second flat surface that forms an outer side face of the light guide member, and
wherein the cushioning member covers the second flat surface.

5. The multi-display system according to claim 3,
wherein the light guide member is a plano-convex lens including a first flat surface that faces the display panel side, a convex surface that bulges towards the display viewing side, and a second flat surface that forms an outer side face of the light guide member, and
wherein the cushioning member covers the entire convex surface and second flat surface.

6. The multi-display system according to claim 3,
wherein the light guide member is a plano-convex lens including a first flat surface that faces the display panel side, a convex surface that bulges towards the display viewing side, and a second flat surface that forms an outer side face of the light guide member, and
wherein the cushioning member covers the second flat surface and a portion of the convex surface.

7. The multi-display system according to claim 3,
wherein the cushioning member part has adhesive characteristics, and
wherein the cushioning member further includes a non-adhesive film covering a surface of the cushioning member part, said surface being opposite to the light guide member.

8. The multi-display system according to claim 3,
wherein the surface of the display panel on the display viewing side is covered by a front covering part provided integrally with the light guide member, and
wherein the surface of the light guide member on the display viewing side and a surface of the front covering part on the display viewing side are connected by a smooth curved surface.

9. The multi-display system according to claim 7,
wherein the non-adhesive film is made of a polyethylene terephthalate film or a triacetyl cellulose film.

* * * * *